US012659718B2

(12) United States Patent
Haswarey et al.

(10) Patent No.: US 12,659,718 B2
(45) Date of Patent: Jun. 16, 2026

(54) ENHANCED USER EQUIPMENT OFF-NETWORK CONNECTION SIGNALING SUPPORT FOR MOBILE VIRTUAL NETWORK OPERATORS

(71) Applicant: T-Mobile Innovations LLC, Overland Park, KS (US)

(72) Inventors: Bashir A. Haswarey, Elmhurst, IL (US); Mohammad Abu-Samra, Orland Park, IL (US); Narothum Saxena, Hoffman Estates, IL (US); Michael S. Irizarry, Barrington Hills, IL (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 264 days.

(21) Appl. No.: 18/379,816

(22) Filed: Oct. 13, 2023

(65) Prior Publication Data
US 2025/0126459 A1     Apr. 17, 2025

(51) Int. Cl.
*H04W 8/18*          (2009.01)
*H04W 8/08*          (2009.01)

(52) U.S. Cl.
CPC ........... *H04W 8/183* (2013.01); *H04W 8/082* (2013.01)

(58) Field of Classification Search
CPC ........ H04W 8/183; H04W 8/082; H04W 8/12
See application file for complete search history.

(56) References Cited

U.S. PATENT DOCUMENTS

| | | | |
|---|---|---|---|
| 2014/0274034 A1 * | 9/2014 | Trapp | H04W 8/06 455/433 |
| 2016/0066175 A1 * | 3/2016 | Wang | H04W 8/02 455/432.1 |
| 2024/0340631 A1 * | 10/2024 | Homorodi | H04W 12/037 |

FOREIGN PATENT DOCUMENTS

| | | | | |
|---|---|---|---|---|
| EP | 3817417 A1 * | 5/2021 | | H04W 8/183 |

OTHER PUBLICATIONS

A first look at the IP exchange Ecosystem—2020 (Year: 2020).*

* cited by examiner

*Primary Examiner* — Nizar N Sivji
(74) *Attorney, Agent, or Firm* — SHOOK, HARDY & BACON L.L.P.; Elena K. McFarland

(57)          ABSTRACT

A method and core network element of a primary network operator (NO) are described for supporting roaming connection signaling messages between a user equipment communicating via a secondary MNO and core network components of a mobile virtual network operator (MVNO) to which an international mobile subscriber identity (IMSI) block has been leased by the primary network operator. The user equipment has a leased IMSI value within a range of IMSI values of the IMSI block, and a roaming services arrangement exists between the primary MNO and the secondary MNO for supporting roaming connectivity of user equipment specifying IMSI values of the primary MNO. The core network element generates an updated connection signaling message by inserting a new destination realm value in a destination field of a received connection signal- (Continued)

UE 103 — Secondary RAN 102 — Secondary MNO Core 104 (including MME 106 DRA 107 & SGW 108)

Secondary MNO 100 (Roaming host)

Internetwork Packet Exchange (IPX) Networks 111

Primary MNO 110

DRA 116 (including leased IMSI block handling supplemental logic 117)

Destination Realm Switch Table 118

Destination Realm-IPX Net Table 119

Primary MNO Core 114

DRA 121

HSS 122

PCRF 124

MME 128

PGW 126

SGW 127

MVNO Core 120

Home Private Network 130 ing message in accordance with a leased IMSI block arrangement between the primary network operator and the MVNO.

14 Claims, 4 Drawing Sheets

| Leased IMSI (block) range 200 | MVNO Realm 210 |

FIG. 2

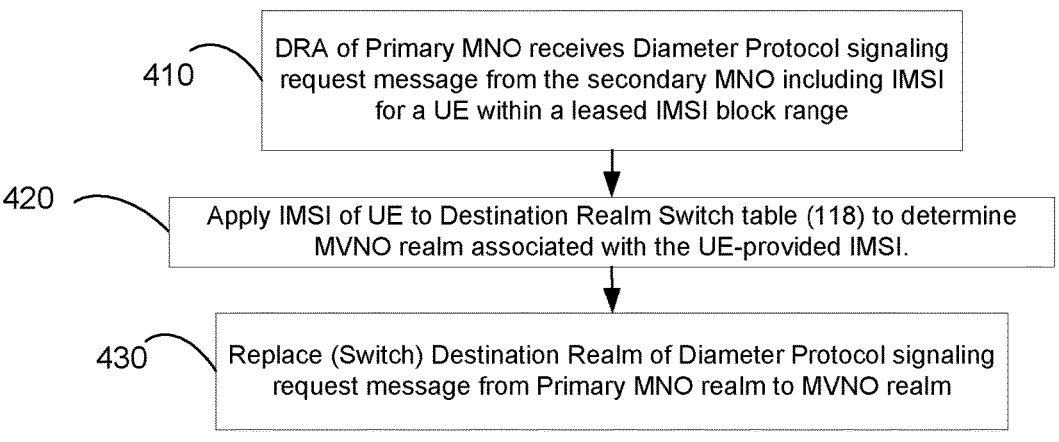

410 — DRA of Primary MNO receives Diameter Protocol signaling request message from the secondary MNO including IMSI for a UE within a leased IMSI block range 420 — Apply IMSI of UE to Destination Realm Switch table (118) to determine MVNO realm associated with the UE-provided IMSI.

430 — Replace (Switch) Destination Realm of Diameter Protocol signaling request message from Primary MNO realm to MVNO realm

FIG. 4

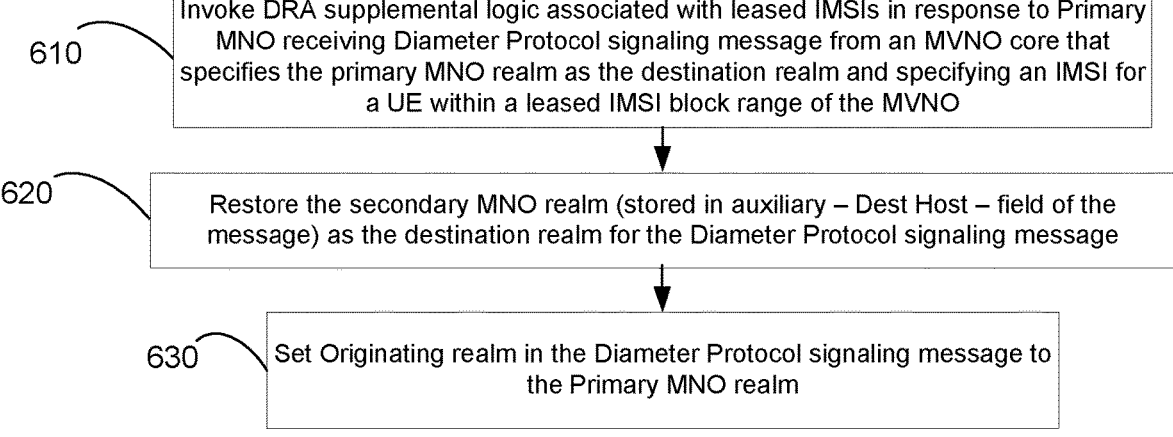

610 — Invoke DRA supplemental logic associated with leased IMSIs in response to Primary MNO receiving Diameter Protocol signaling message from an MVNO core that specifies the primary MNO realm as the destination realm and specifying an IMSI for a UE within a leased IMSI block range of the MVNO 620 — Restore the secondary MNO realm (stored in auxiliary – Dest Host – field of the message) as the destination realm for the Diameter Protocol signaling message 630 — Set Originating realm in the Diameter Protocol signaling message to the Primary MNO realm

FIG. 6

ENHANCED USER EQUIPMENT OFF-NETWORK CONNECTION SIGNALING SUPPORT FOR MOBILE VIRTUAL NETWORK OPERATORS

FIELD OF THE INVENTION

The present disclosure generally relates to mobile wireless communications. More particularly, the present disclosure is directed to providing diameter protocol (including authentication, authorization and accounting support) to network operators supporting sponsored roaming data service support for user equipment (including Internet of things devices) associated with mobile virtual network operators.

BACKGROUND OF THE INVENTION

Mobile wireless network operator (MNO) carriers are known to provide radio access network (RAN) support for mobile virtual network operators (MVNOs). In a particular arrangement of interest herein, a heavy MVNO includes a fully operational core network but does not own/operate RAN infrastructure or may own/operate a RAN with limited coverage. In areas where cellular service is needed, the heavy MVNO relies upon a RAN of a primary MNO and is assigned international mobile subscriber identity (IMSI) blocks leased from the primary MNO (also referred to herein as a host mobile carrier). It is noted that as used herein, the term "leased" is intended to cover any of a variety of acts of reassigning IMSI blocks by an officially registered entity (MNO) to a another (unregistered) entity, such as an MVNO as described herein.

In cases where user equipment (UE) devices of the MVNO issue a connection signaling message in a geographic area that is not served by a primary MNO with which the MVNO has an agreement for supporting data services, a challenge exists for performing connection signaling (e.g., Diameter Protocol) for setting up a roaming mobile wireless data service, via the secondary MNO, in support of such UE devices that are present in the area served by the secondary MNO's RAN.

By way of a particular example, the UE device is an Internet of Things (IoT) appliance. The heavy MVNO has established a services agreement supporting the IoT appliance with the primary MNO for handling roaming UE devices within a particular range of IMSI blocks leased from the primary MNO. Moreover, the primary MNO has a roaming services agreement with the secondary MNO such that the secondary MNO supports mobile wireless data service requests of UE devices identified as falling within certain IMSI ranges. In such scenario, the intention is to support connection initiation signaling in association with support of mobile wireless data service requests by IoT appliances of the heavy MVNO, via a RAN of the secondary MNO, without the secondary MNO having knowledge of the IoT appliances' relationship with the MVNO.

SUMMARY OF THE INVENTION

A core network element of a primary network operator (NO), in accordance with the present disclosure, is configured to support roaming connection signaling messages between a user equipment communicating via a secondary mobile network operator (MNO) and core network components of a mobile virtual network operator (MVNO) to which an international mobile subscriber identity (IMSI) block has been leased by the primary network operator. The user equipment has a leased IMSI value within a range of IMSI values of the IMSI block, and a roaming services arrangement exists between the primary NO and the secondary MNO for supporting roaming connectivity of user equipment specifying IMSI values of the primary NO. The core network, in such environment, is configured to carry out a method that includes receiving a connection signaling message issued by the MVNO that identifies a leased IMSI value of the user equipment communicating via the secondary MNO and includes a secondary MNO realm value of the secondary MNO, wherein a destination realm field specifies a primary NO realm value of the primary NO, and wherein the secondary MNO realm value is stored in an auxiliary element in the connection signaling message. The method includes generating an updated connection signaling message by: replacing, in the destination realm field of the connection signaling message, the primary MNO realm value by the secondary MNO realm value specified in the auxiliary element of the connection signaling message, and setting an originating realm to the primary NO realm value. The method further includes forwarding the updated connection signaling message to the secondary MNO via an internetwork packet exchange corresponding to the secondary MNO.

A core network element of a primary network operator (NO), in accordance with the present disclosure, is configured to support roaming connection signaling messages between a user equipment communicating via a secondary MNO and core network components of a mobile virtual network operator (MVNO) to which an international mobile subscriber identity (IMSI) block has been leased by the primary network operator. The user equipment has a leased IMSI value within a range of IMSI values of the IMSI block, and wherein a roaming services arrangement exists between the primary NO and the secondary MNO for supporting roaming connectivity of user equipment specifying IMSI values of the primary MNO. The method comprises receiving a connection signaling message originating from the secondary MNO that identifies a leased IMSI value of the user equipment communicating via the secondary MNO. Applying the leased IMSI value to a leased realm storage maintained by the primary network operator to identify an MNVO realm value of the MVNO corresponding to the leased IMSI block containing the leased IMSI value. The method includes generating an updated connection signaling message by inserting the MVNO realm value into a destination realm field of the connection signaling message. The method further includes forwarding the updated connection signaling message to the MVNO core via an internetwork packet exchange corresponding to the MVNO core.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 2 is a schematic diagram summarizing an exemplary set of fields of an leased IMSI-to-Destination MVNO realm

Figure 3:
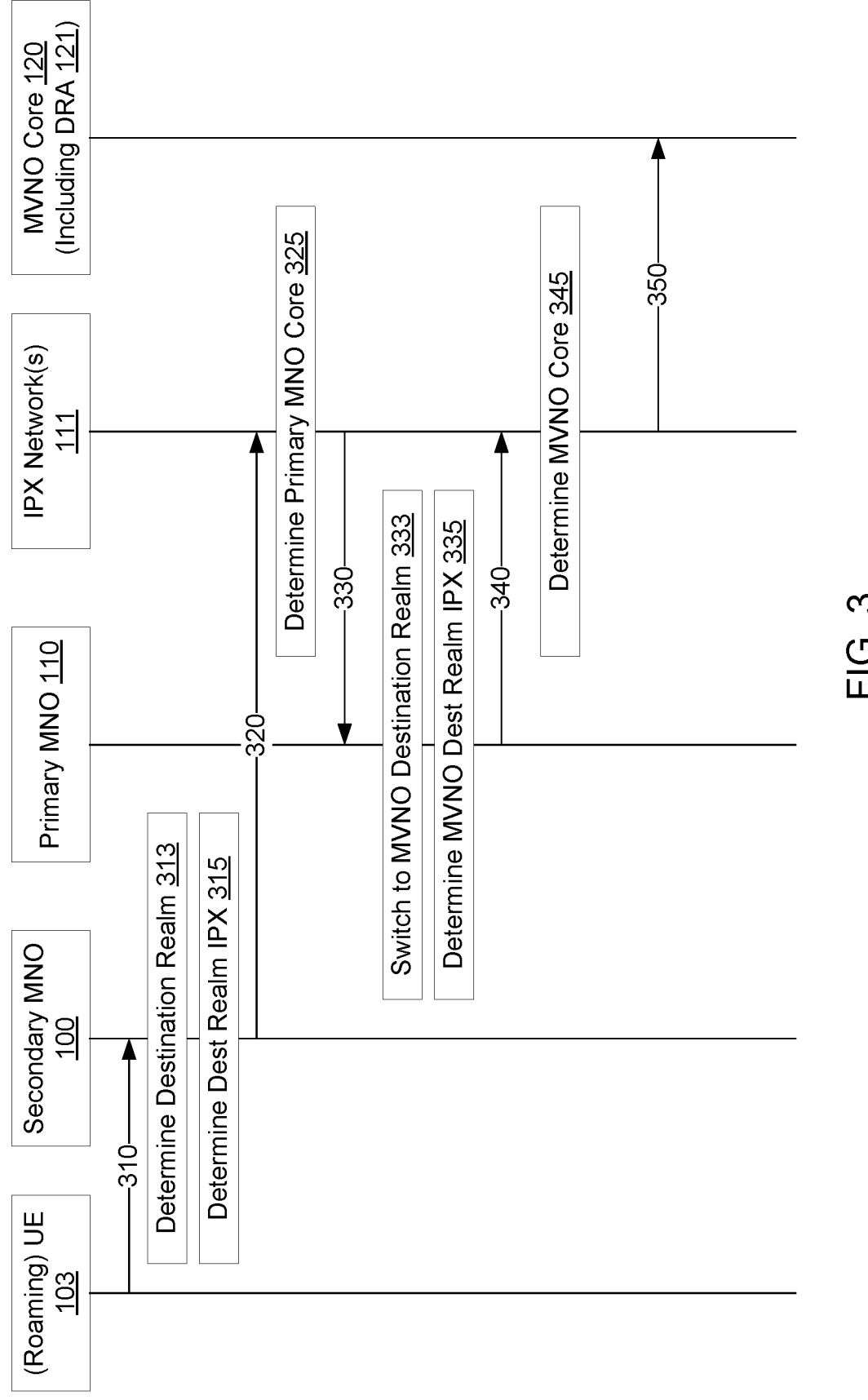
Figure 5:
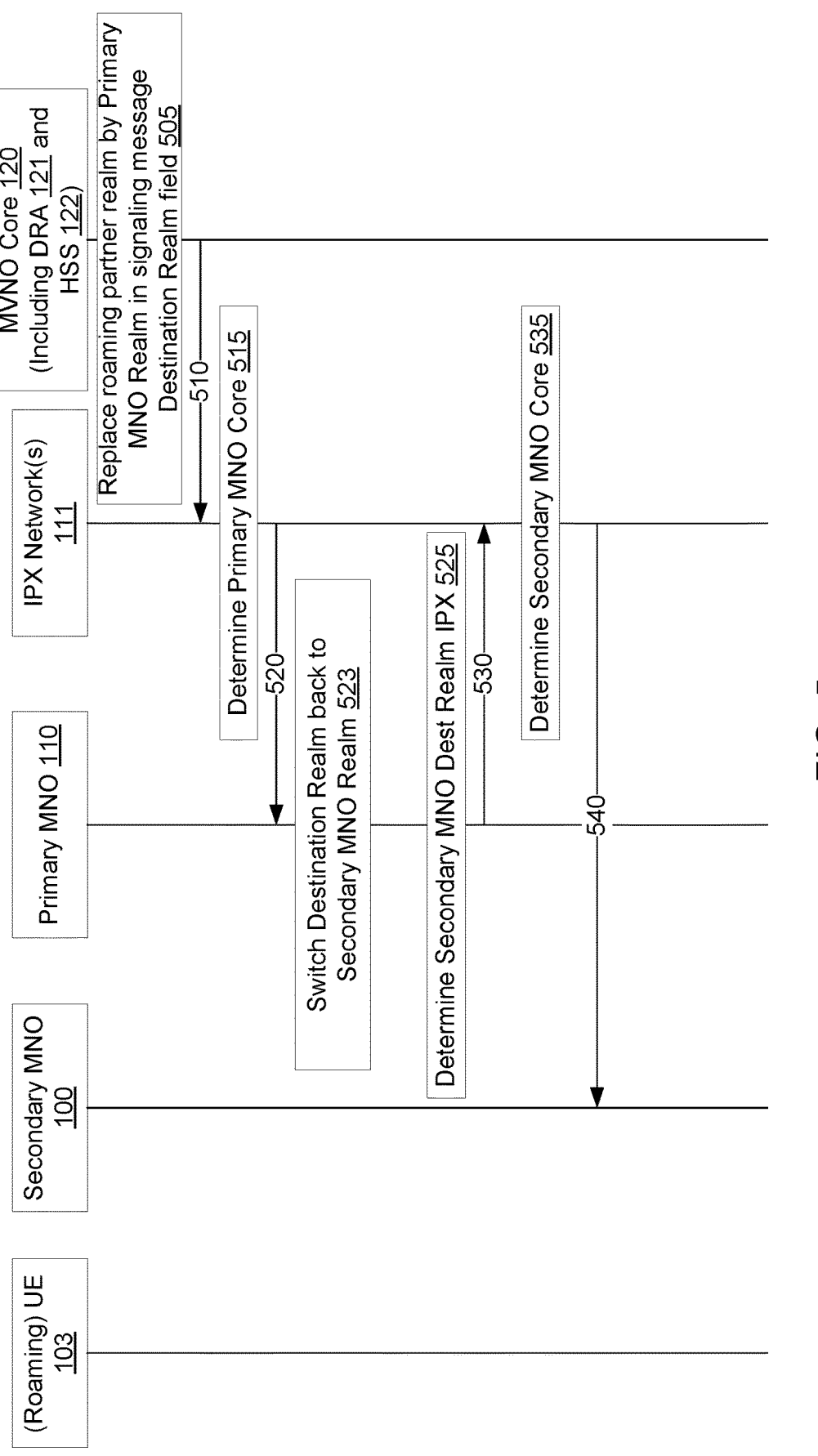

US 12,659,718 B2 mapping entry maintained by a primary MNO to support connection signaling (e.g., Diameter Protocol) message routing between UE devices assigned IMSI values within a leased IMSI range assigned by the primary MNO to an identified MVNO in accordance with the disclosure;

FIG. 3 is a sequence diagram summarizing messaging flow for executing connection signaling message routing in accordance with the disclosure for a UE-originated signaling message;

FIG. 4 is a flow diagram summarizing an exemplary set of operations carried out by a diameter routing agent (DRA) of a primary MNO in accordance with the UE-originated signaling of FIG. 3 in accordance with the present disclosure;

FIG. 5 is a sequence diagram summarizing messaging flow for executing connection signaling message routing in accordance with the disclosure for an MVNO's HSS-originated signaling message; and FIG. 6 is a flow diagram summarizing an exemplary set of operations carried out by a diameter routing agent (DRA) of a primary MNO in accordance with the MVNO's HSS-originated signaling of FIG. 5 in accordance with the present disclosure.

DETAILED DESCRIPTION OF THE DRAWINGS

A system, in accordance with the present disclosure, includes a primary MNO hosting UE devices associated with an MVNO and that may operate in a geographic region requiring the use of a secondary MNO to provide roaming mobile wireless data services for MVNO-affiliated UE devices.

In operation, a UE device having an IMSI within a range leased to UE devices of the MVNO issues a Diameter Protocol connection signaling message (e.g., Authentication Information Request (AIR), Update Location Request (ULR), Notify Request, Purge User Equipment Request, Mobile Origination Forward Short Message Request (OFR), etc.) to a RAN of the secondary MNO. A mobility management entity (MME) of a secondary MNO core resolves a provided IMSI to the primary MNO and forwards the connection signaling message to the primary MNO in accordance with a roaming data services agreement entered between the secondary MNO and the primary MNO. A Diameter protocol routing agent (DRA) of the primary MNO, in turn, applies the provided IMSI to an IMSI range mapping table (see FIG. 2 for table entry example) to identify/retrieve an applicable destination realm corresponding to the MVNO. The DRA of the primary MNO writes the MVNO's realm into the destination realm field of the Diameter Protocol connection signaling message from the UE. Thereafter, the DRA of the primary MNO issues the updated Diameter Protocol connection signaling message to an IPX associated with the MVNO for provision to a destination DRA of an MVNO.

Additionally, a Diameter Protocol connection signaling message (e.g., Cancel Location Request (CLR), Insert Data Request (IDR), Delete Subscriber Request (DSR), and Reset Request, Mobile Termination Forward Short Message Request (TFR), etc.) originating from the MVNO including an IMSI value falling within the leased IMSI range of the MVNO and identifying the primary MNO realm is issued by the DRA of the MVNO (and in the case of a roaming UE connected to the RAN of the secondary MNO) identifies an MME of the secondary MNO as the destination host. The DRA of the primary MNO receives the Diameter Protocol connection signaling message including the specified primary MNO realm and the MME of the Secondary MNO host. Using the received destination host of the MME of the secondary MNO, the DRA of the primary MNO, inserts the secondary MNO realm in place of the primary MNO realm in the destination realm of the connection signaling message. Thereafter, the DRA of the primary MNO forwards the updated Diameter Protocol connection signaling message to the secondary MNO core for further processing by the DRA and MME of the secondary MNO.

The above-summarized operation of a network in accordance with the present disclosure is further described, by way of detailed examples, herein below.

Figure 1:
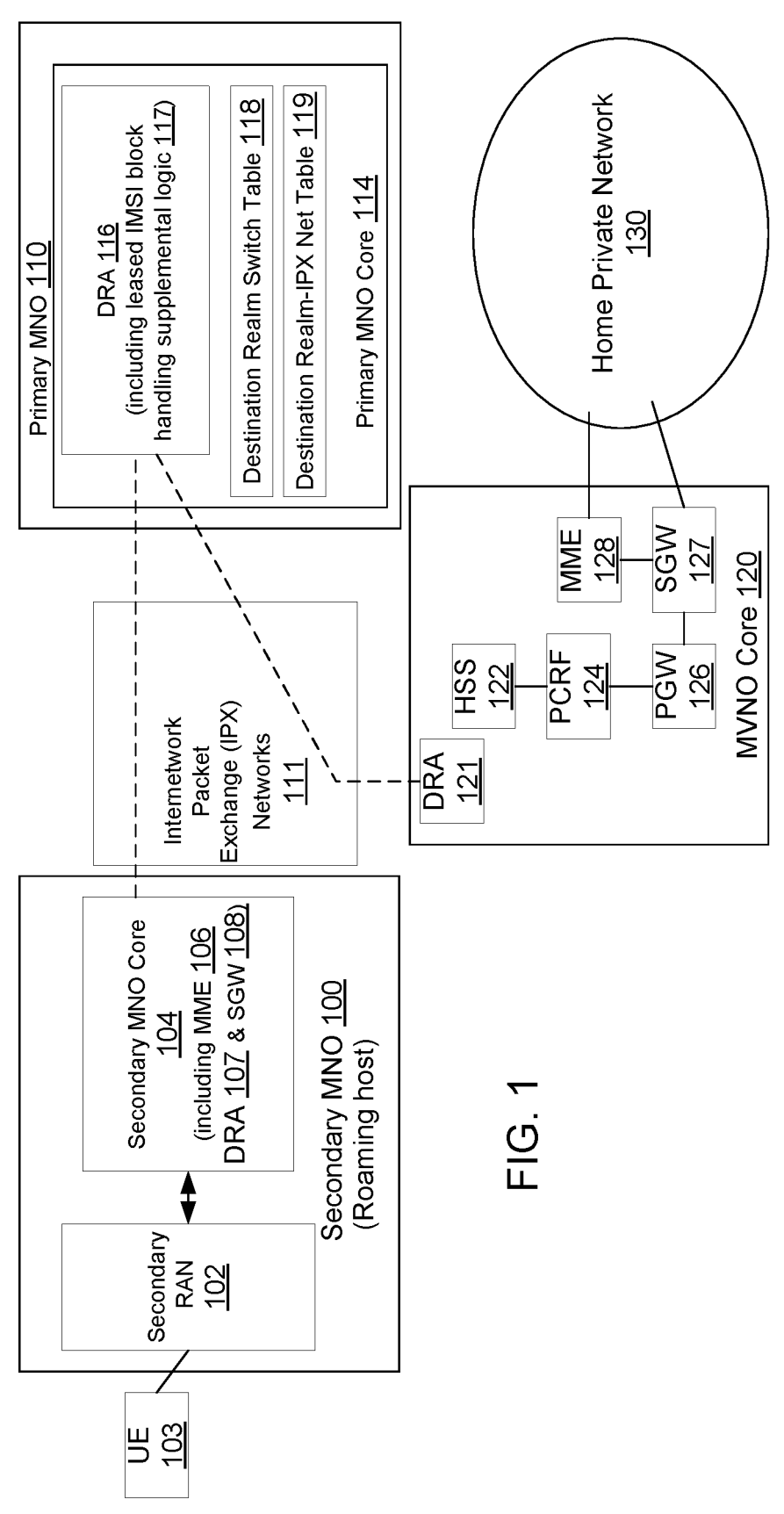
FIG. 1 is a schematic diagram of an exemplary mobile wireless network radio network environment including a secondary MNO having a RAN through which UE devices of an MVNO establish an air connection, and a primary MNO providing an intermediate connection between the secondary MNO and the MVNO in accordance with the disclosure.

Turning to FIG. 1, an exemplary environment for carrying out the present disclosure is schematically depicted. A secondary mobile network operator (MNO) 100, operating as a roaming mobile wireless data services host, includes a secondary RAN 102 and a secondary MNO core 104 network. The secondary RAN 102 is configured to receive a Diameter Protocol connection signaling message from a UE device 103 for mobile wireless data network services. The secondary MNO core 104 includes a mobility management entity (MME) 106, a DRA 107, and a source gateway (SGW) 108.

The secondary MNO 100 is configured to communicate with a primary MNO 110 (or more generally a network operator (NO) that may/may not operate an associated RAN) via an internetwork data packet exchange (IPX) of a plurality of IPX networks 111. By way of example, communication between the secondary MNO 100 and primary MNO is carried out in accordance with IR.21 (GSM Association Roaming Database, Structure and Updating Procedures) under which the IMSI blocks (ranges of IMSI values) assigned to the primary MNO 110 are published to all secondary MNOs, including the secondary MNO 100.

In accordance with the present disclosure, the primary MNO 110 includes a primary MNO core 114 that includes a DRA 116. In accordance with the present disclosure, the DRA 116 contains supplemental leased IMSI block handling logic (supplemental logic) 117. The supplemental logic 117 (described herein below with reference to FIG. 4) applies an IMSI from a leased IMSI block of (e.g., owned by, registered to, etc.) the primary MNO 110 that is specified in a received Diameter Protocol connection signaling message to a destination realm switch table 118 comprising a set of entries identifying leased IMSI value ranges and MVNOs to which each of the IMSI ranges have been leased by the primary MNO 110.

FIG. 2 provides an exemplary set of fields of an example entry in the destination realm switch table 118. By way of example, the set of fields include an IMSI range 200 (corresponding to a leased IMSI block) and a corresponding MVNO realm identifier 210.

With continued reference to FIG. 1, The DRA 116 further includes an IPX correlation table 119 identifying, for each destination realm in the realm switch table 118, an IPX associated with the destination realm.

In accordance with the present disclosure, in addition to carrying out known authentication/authorization messaging for UE devices of the primary MNO 110, the DRA 116 supports routing Diameter Protocol connection signaling messages between the secondary MNO 100 and a DRA 121 of an MVNO core 120 with which the UE 103 is associate (i.e. an IMSI assigned to the UE 103 is within a range of IMSI values leased by the primary MNO 110 to the MVNO having the MVNO core 120. As such, the DRA 116 operates as an intermediate node for routing Diameter Protocol connection signaling messages between the UE 103 connected to the secondary MNO 100 and the MVNO core 120.

In accordance with a further aspect of the disclosure, the DRA 116, upon determining (using the destination realm switch table 118) the IMSI of the UE 103 falls within a range of IMSIs of an IMSI block leased to an MVNO corresponding to the MVNO core 120, updates the destination realm of a received Diameter Protocol connection signaling message to the realm of the MVNO core 120 and forwards the connection signaling message to the DRA 121 of the MVNO core 120. The MVNO core 120, by way of example, includes a full set of core components such as: a home subscriber server (HSS) 122, a PCRF 124, and a PGW 126. By way of example, the MVNO core 120 operates within a home private network 130 that operates to directly host connectivity of UE devices via a source gateway (SGW) 127 and MME 128, of the MVNO 120 in accordance with terms of the identified/retrieved agreement between the primary MNO 110 and the identified MVNO 120. The PWG 126, upon establishing a tunneling connection to the IoT UE device 103, connects to, for example, an application server 130 (e.g., real-time video monitoring server) supporting an application session between the application server 130 and the IOT UE device 103.

With continued reference to FIG. 1, it is noted that simplified depictions are provided of the primary MNO 110 and the secondary MNO 100 to emphasize enhanced aspects of the primary MNO 110 relating to the DRA 116 operating as an intermediate routing node between the DRA 107 of the secondary MNO 100 and the DRA 121 of the MVNO core 120.

Turning to FIG. 3, a sequence diagram summarizes a message flow for Diameter Protocol connection signaling messaging originating from the UE 103 having an IMSI falling within a range of IMSI values of an IMSI block leased by the primary MNO 110 to the MVNO corresponding to the MVNO core 120.

The sequence of operations and message flows summarized in FIG. 3 are carried out in accordance with a previously established context summarized herein below that enables the identified network entities to interoperate to perform their respective operations for processing a Diameter Protocol connection signaling message issued by the UE 103 seeking data services via the secondary MNO 100. To support such processing, the primary MNO 110 has an established roaming support services agreement with the secondary MNO 100. In association with the roaming support services agreement, the primary MNO 110 has provided a set of IMSI blocks (a range of IMSI values assigned to the primary MNO 110) for which the secondary MNO 100 agrees to provide roaming service support (as well as an IPX provider through which Diameter Protocol connection signaling messages are to be forwarded to a destination realm corresponding to the primary MNO 110).

Importantly, the IMSI blocks owned by/registered to the primary MNO 110 are potentially provided to the secondary MNO 100 before the primary MNO 110 has leased certain ones of the IMSI blocks to one or more MVNOs (e.g. the MVNO corresponding to the MNVO core 120). Therefore, at the time of receiving a Diameter Protocol connection signaling message from the UE 103, the DRA 107 has no knowledge of the DRA 121 of the MVNO core 120 that has leased an IMSI block containing the IMSI of the UE 103. On the other hand, the DRA 116 of the primary MNO 110 possesses such knowledge in an entry corresponding to the leased IMSI block in the destination realm switch table 118 having entries of the type summarized in FIG. 2.

With continued reference to FIG. 3, during 310 the UE 103 operating off network, and seeking to establish a roaming connection via the secondary RAN 102 of the secondary MNO 100, issues a Diameter Protocol connection signaling message (e.g., AIR, ULR, OFR, etc.) The message includes an IMSI falling within a leased IMSI block owned by/registered to the primary MNO 110 (but leased to the MVNO corresponding to the MVNO core 120).

During 313, the DRA 107 of the secondary MNO 100, using pre-configured IMSI block-to-realm mapping and destination realm-to-IPX provider mapping, initially determines a destination realm (i.e., the primary MNO 110 realm that owns the IMSI block containing the IMSI provided by the UE 103) corresponding to the Diameter Protocol connection signaling message from the UE 103.

Thereafter, during 315, the DRA 107 using pre-configured destination realm-to-IPX provider mapping, determines an IPX provider (of the IPX networks 111) corresponding to the destination realm (i.e. realm of the primary MNO 110).

During 320, the DRA 107 forwards the connection signaling message to the IPX provider corresponding to the destination realm (i.e., the primary MNO 110 realm) determined during 315.

Thereafter, during 325, the IPX provider determines, using a destination realm-to-MNO core mapping table entry corresponding to the provided destination realm, that the connection signaling message is to be forwarded to the primary MNO core 114.

During 330, the IPX provider forwards the connection signaling message (originating from the UE 103) to the primary MNO core 114.

During 333 (described in detail herein below with reference to FIG. 4), the DRA 116 of the primary MNO core 114 processes the connection signaling message containing the IMSI of the UE 103 (leased to the MVNO corresponding to the MVNO core 120) to provide a modified message containing a switched destination realm (i.e. the realm of the MVNO corresponding to the MVNO core 120). In accordance with the present disclosure, during 333, the DRA 116 executes the supplemental logic 117 for handling an IMSI falling within a range of a leased IMSI block. More specifically, the DRA 116, using the contents of the destination realm switch table 118 discussed herein above, determines that the IMSI provided by the UE 103 is within an IMSI range of an IMSI block leased to the MVNO corresponding to the MVNO core 120. The DRA 116, based on an entry in the destination realm switch table 118 identifying the MVNO corresponding to a leased IMSI block containing the IMSI of the UE 103, generates a modified version of the received connection signaling message by inserting the realm of the MVNO core 120 in place of the realm of the secondary MNO core 114.

During 335, the DRA 116 of the primary MNO 110, using pre-configured destination realm-to-IPX provider mapping, determines an IPX provider (of the IPX networks 111) corresponding to the destination realm (i.e. realm of the MVNO corresponding to the MVNO core 120) that was specified by the destination realm switch table 118 entry identified by the DRA 116 during 333 in accordance with the present disclosure.

During 340, the DRA 116 forwards the connection signaling message to the IPX provider corresponding to the destination realm (i.e., the MVNO realm) determined during 333.

Thereafter, during 345, the IPX provider determines, using a destination realm-to-MNO core mapping table entry corresponding to the provided destination realm, that the connection signaling message (originated at the UE 103 specifying an IMSI of an IMSI block leased by the primary MNO 110 to the MVNO corresponding to the MVNO core 120) is to be forwarded to the MVNO core 120.

During 350, the IPX provider forwards the connection signaling message (originating from the UE 103) to the MVNO core 120 for further Diameter Protocol connection signaling message processing.

Turning to FIG. 4, operation of the supplemental logic of the DRA 116, executed during 333 (of the sequence summarized in FIG. 3 discussed herein above) for handling Diameter Protocol connection signaling messages originating from a secondary MNO with which a roaming arrangement has been established for handling particular IMSI ranges (blocks) is described. During 410 the DRA 116 of the primary MNO 110 receives a Diameter Protocol connection signaling message (e.g., AIR, ULR, OFR) forwarded by the secondary MNO 110 via one of the IPX networks 111. The connection signaling message includes, in pertinent part, a destination realm field corresponding to the primary MNO 110 and, importantly, an IMSI value falling within a range of an IMSI block that is owned by/registered to the primary MNO 110, but has been subsequently leased to an MVNO corresponding to the MVNO core 120 including the DRA 121.

A value of the IMSI falling within a range of leased IMSI blocks causes invocation of the supplemental logic 117 of the DRA 116 to execute a destination realm switch during 420. In particular, during 420, the supplemental logic 117 determines a destination realm of the MVNO that leased an IMSI block containing the IMSI value provided by the UE 103 in the Diameter Protocol connection signaling message to the secondary MNO 100. By way of example, such determination is made by the DRA 116 applying the IMSI value specified in the received Diameter Protocol connection signaling message of the UE 103 to the destination realm switch table 118 comprising a set of entries identifying leased IMSI blocks and realms of MVNOs to which each identified IMSI block has been leased.

Thereafter, the supplemental logic 117 replaces the destination realm value contained in the connection signaling message received by the DRA 116 by the realm value of the MVNO to which an IMSI block containing the IMSI value of the UE 103 has been leased by the primary MNO 110. At this point, the DRA 116 can resume normal operation for forwarding the updated Diameter Protocol connection signaling message to an IPX corresponding to the MVNO core 120.

Turning to FIG. 5, a sequence diagram summarizes a message flow for connection signaling messages originating from the MVNO core 120 directed to the UE 103 that is presently connected to the secondary MNO 100. Such messaging includes, for example a "CLR" message issued by the HSS 122 for delivery to the UE 103. The connection signaling message from the MVNO core 120 cannot be issued directly to the secondary MNO 100 since the realm of the MVNO core 120 is not known/recognized by the secondary MNO 100 that is presently operating as the roaming host MNO for the UE 103. The messaging sequence and associated operations (including in particular operation of the DRA 117 of the primary MNO 110) of FIG. 5 addresses this problem by configuring and operating the DRA 117 as an entity that is recognized by both the secondary MNO 100 and the MVNO of the MVNO core 120.

The sequence of operations and message flows summarized in FIG. 5 are carried out in accordance with a previously established context summarized herein below that enables the identified network entities to interoperate to perform their respective operations for processing a Diameter Protocol connection signaling message issued by the MVNO core 120 (e.g., the HSS 122) for delivery to the UE 103 that has previously established a roaming connection to the secondary MNO 100 via messaging performed in accordance with the operations summarized in FIGS. 3 and 4 discussed herein above. To support such connection, the primary MNO 110 has an established roaming support services agreement with the secondary MNO 100. In association with the roaming support services agreement, the primary MNO 110 has provided a set of IMSI blocks (a range of IMSI values assigned to the primary MNO 110) for which the secondary MNO 100 agrees to provide roaming service support (as well as an IPX provider through which Diameter Protocol connection signaling messages are to be forwarded to a destination realm corresponding to the primary MNO 110). The DRA 116 of the primary MNO 116, by virtue of the contents of destination realm switch table 118, is able to confirm that an IMSI of the UE 103 specified in a message originating from the MVNO core 120. Thus, the DRA 116 is able to function as a proxy and issue Diameter Protocol connection signaling messages originating from the MVNO core 120 to the secondary MNO 100. When performing such forwarding, the DRA 116 replaces an origin realm value specifying the MVNO realm of the MVNO core 120 with the primary MNO 110 realm value that is recognized by the DRA 107 of the secondary MNO 100.

With continued reference to FIG. 5, during 505 the MVNO core 120 (including the HSS 122 that is the source of the connection signaling message and the DRA 121 that builds and issues the connection signaling message) initiates building a Diameter Protocol connection signaling message (e.g. CLR, TFR, etc.) to be sent to the UE 103 operating off network and currently connected to the secondary MNO 100 based upon the IMSI assigned to UE 103 that is taken from the IMSI block leased to the MVNO by the primary MNO 110. Leased IMSI roaming support logic executed by the DRA 121 intercepts any connection signaling messages that do not specify the primary MNO 110 realm as the destination realm performs the following changes to the connection signaling message: (1) copy the non-primary MNO realm currently in the destination realm field to an auxiliary field (e.g. append to an optional destination host field) of the connection signaling message; and (2) replace the non-primary MNO realm by the primary MNO 110 realm in the destination realm field.

During 510, the MVNO core 120 forwards the connection signaling message, modified as described herein above during 505, to an IPX provider corresponding to the current destination realm specified in the modified connection signaling message—in this case the IPX provider for the primary MNO 110 realm.

Thereafter, during 515, the IPX provider determines, using a destination realm-to-MNO core mapping table entry corresponding to the provided destination realm, that the connection signaling message is to be forwarded to the primary MNO core 114.

During 520, the IPX provider forwards the connection signaling message (originating from the MVNO core 120) to the primary MNO core 114.

During 523, the DRA 116 of the primary MNO core 114 executes the supplemental logic 117 based upon the presence, in the received connection signaling message, of: (1) the IMSI value of the UE 103 is within a leased IMSI block range of the MVNO core 120 realm specified in an entry of the destination realm switch table 118; and (2) the re-positioned secondary MNO realm in the auxiliary field (e.g. the optional destination host field). If both conditions are met, then the DRA 116 supplemental logic 117 generates an updated version of the connection signaling message to have: (1) a destination realm identifying the secondary MNO 100 realm, and (2) an originating realm identifying the primary MNO 110 realm. The updating is carried out by, for example: (1) retrieving the secondary MNO 100 realm (stored in auxiliary field) and placing the secondary MNO 100 realm back in the destination realm of the connection signaling message (i.e. restoring the destination realm displaced during 505); and (2) inserting the primary MNO 110 realm into the originating realm field of the connection signaling message.

During 525, the DRA 116, using pre-configured destination realm-to-IPX provider mapping, determines an IPX provider (of the IPX networks 111) corresponding to the destination realm (i.e. realm of the secondary MNO 100).

During 530, the DRA 107 forwards the connection signaling message to the IPX provider corresponding to the destination realm (i.e., the secondary MNO 110 realm) determined during 525.

During 535, the IPX provider determines, using a destination realm-to-MNO core mapping table entry corresponding to the provided destination realm, that the connection signaling message is to be forwarded to the secondary MNO core 104.

During 540, the IPX forwards the connection signaling message (originating from the UE 103) to the secondary MNO core 104 for processing and passing on to the UE 103 connected to the secondary MNO 100 in accordance with a roaming arrangement between the primary MNO 110 and the secondary MNO 100.

Turning to FIG. 6, operation of the supplemental logic 117 of the DRA 116, executed during 523 (of the sequence summarized in FIG. 5 discussed herein above) for handling Diameter Protocol connection signaling messages originating from the MVNO core 120 that specify the IMSI of the UE 103 that is within a range of the IMSI block owned by/registered to the primary MNO 110 and leased to the MVNO having the MVNO core 120.

During 610, operation of the supplemental logic 117 of the DRA 116 is conditionally invoked in response to receiving the Diameter Protocol connection signaling message where: (1) the IMSI value of the UE 103 is within a leased IMSI block range of the MVNO core 120 realm specified in an entry of the destination realm switch table 118; and (2) the re-positioned secondary MNO realm is present in the auxiliary field (e.g. the optional destination host field). If both conditions are met, then the DRA 116 supplemental logic 117, during 620 and 630, generates an updated version of the connection signaling message to have: (1) a destination realm field identifying the secondary MNO 100 realm, and (2) an originating realm field identifying the primary MNO 110 realm. The updating is carried out by, for example: (1) retrieving the secondary MNO 100 realm (stored in auxiliary field) and placing the secondary MNO 100 realm back in the destination realm of the connection signaling message (i.e. restoring the destination realm displaced during 505); and (2) inserting the primary MNO 110 realm into the originating realm field of the connection signaling message. The supplemental logic 117 may further perform the optional operation of removing the secondary MNO 100 realm from the auxiliary field.

The connection signaling message, transformed by the DRA 116 supplemental logic 117 is thereafter forwarded to the secondary MNO according to the operations described herein above with reference to FIG. 5.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method carried out by a core network element of a primary network operator (NO) to support roaming connection signaling messages between a user equipment communicating via a secondary mobile network operator (MNO) and core network components of a mobile virtual network operator (MVNO) to which an international mobile subscriber identity (IMSI) block has been leased by the primary network operator, wherein the user equipment has a leased IMSI value within a range of IMSI values of the IMSI block, and wherein a roaming services arrangement exists between the primary NO and the secondary MNO for supporting roaming connectivity of user equipment specifying IMSI values of the primary NO, the method comprising:

receiving a connection signaling message issued by the MVNO that identifies a leased IMSI value of the user equipment communicating via the secondary MNO and includes a secondary MNO realm value of the secondary MNO, wherein a destination realm field specifies a primary NO realm value of the primary NO, and wherein the secondary MNO realm value is stored in an auxiliary element in the connection signaling message;

generating an updated connection signaling message by:

replacing, in the destination realm field of the connection signaling message, the primary MNO realm value by the secondary MNO realm value specified in the auxiliary element of the connection signaling message, and setting an originating realm to the primary NO realm value; and forwarding the updated connection signaling message to the secondary MNO via an internetwork packet exchange corresponding to the secondary MNO.

2. The method of claim 1, wherein the primary network operator is a mobile network operator (MNO).

3. The method of claim 1, wherein the connection signaling messages are Diameter Protocol connection signaling messages.

4. The method of claim 3, wherein the core network element is a diameter routing agent.

5. The method of claim 3, wherein the connection signaling message is a signaling message taken from the group consisting of: Cancel Location Request (CLR), Insert Data Request (IDR), Delete Subscriber Request (DSR), Reset Request, and a Mobile Termination Forward Short Message Request (TFR).

6. The method of claim 1, further comprising:

confirming, by applying the leased IMSI value to a leased realm storage maintained by the primary network operator, that the leased IMSI value is leased to an MVNO realm identified in a source realm field of the connection signaling message.

7. The method of claim 1, further comprising:

receiving a further connection signaling message originating from the secondary MNO that identifies a leased IMSI value of the user equipment communicating via the secondary MNO;

applying the leased IMSI value to a leased realm storage maintained by the primary network operator to identify an MNVO realm value of the MVNO corresponding to the leased IMSI block containing the leased IMSI value;

generating an updated further connection signaling message by inserting the MVNO realm value into a destination realm field of the further connection signaling message; and forwarding the updated further connection signaling message to the MVNO core via an internetwork packet exchange corresponding to the MVNO core.

8. A core network element of a primary network operator (NO), wherein the core network element comprises:

a processor; and a non-transitory computer readable medium including computer-executable instructions that, when executed by the processor, carry out a method for supporting roaming connection signaling messages between a user equipment communicating via a secondary MNO and core network components of a mobile virtual network operator (MVNO) to which an international mobile subscriber identity (IMSI) block has been leased by the primary network operator, wherein the user equipment has a leased IMSI value within a range of IMSI values of the IMSI block, and wherein a roaming services arrangement exists between the primary MNO and the secondary MNO for supporting roaming connectivity of user equipment specifying IMSI values of the primary MNO, and wherein the method comprises:

receiving a connection signaling message issued by the MVNO that identifies a leased IMSI value of the user equipment communicating via the secondary MNO and includes a secondary MNO realm value of the secondary MNO, wherein a destination realm field specifies a primary MNO realm value of the primary MNO, and wherein the secondary MNO realm value is stored in an auxiliary element in the connection signaling message;

generating an updated connection signaling message by:

replacing, in the destination realm field of the connection signaling message, the primary MNO realm value by the secondary MNO realm value specified in the auxiliary element of the connection signaling message, and setting an originating realm to the primary MNO realm value; and forwarding the updated connection signaling message to the secondary MNO via an internetwork packet exchange corresponding to the secondary MNO.

9. The core network element of claim 8 wherein the primary network operator is a mobile network operator.

10. The core network element of claim 8 wherein the connection signaling messages are Diameter Protocol connection signaling messages.

11. The core network element of claim 10 wherein the core network element is a diameter routing agent.

12. The core network element of claim 10 wherein the connection signaling message is a signaling message taken from the group consisting of: Cancel Location Request (CLR), Insert Data Request (IDR), Delete Subscriber Request (DSR), Reset Request, and a Mobile Termination Forward Short Message Request (TFR).

13. The core network element of claim 8, further comprising:

confirming, by applying the leased IMSI value to a leased realm storage maintained by the primary network operator, that the leased IMSI value is leased to an MVNO realm identified in a source realm field of the connection signaling message.

14. The core network element of claim 8, further comprising:

receiving a further connection signaling message originating from the secondary MNO that identifies a leased IMSI value of the user equipment communicating via the secondary MNO;

applying the leased IMSI value to a leased realm storage maintained by the primary network operator to identify an MNVO realm value of the MVNO corresponding to the leased IMSI block containing the leased IMSI value;

generating an updated further connection signaling message by inserting the MVNO realm value into a destination realm field of the further connection signaling message; and forwarding the updated further connection signaling message to the MVNO core via an internetwork packet exchange corresponding to the MVNO core.

* * * * *